(12) United States Patent  
Downs et al.

(10) Patent No.: US 8,113,979 B2  
(45) Date of Patent: *Feb. 14, 2012

(54) FOUR PINION DIFFERENTIAL WITH CROSS PIN RETENTION UNIT AND RELATED METHOD

(75) Inventors: James P. Downs, South Lyon, MI (US); Heather A. Moore, Greenville, SC (US); Joseph S. Balenda, II, Grand Blanc, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/041,544

(22) Filed: Mar. 7, 2011

(65) Prior Publication Data

US 2011/0152028 A1   Jun. 23, 2011

Related U.S. Application Data

(63) Continuation of application No. 12/237,726, filed on Sep. 25, 2008, now Pat. No. 7,901,318.

(60) Provisional application No. 60/975,613, filed on Sep. 27, 2007.

(51) Int. Cl.  
F16H 48/06 (2006.01)

(52) U.S. Cl. ....................................... 475/230

(58) Field of Classification Search ................ None  
See application file for complete search history.

(56) References Cited

U.S. PATENT DOCUMENTS

| | | |
|---|---|---|
| 2,971,404 A | 2/1961 | Thornton |
| 3,593,595 A | 7/1971 | Taylor |
| 3,651,713 A | 3/1972 | Mueller |
| 3,894,447 A | 7/1975 | Michael |
| 3,974,717 A | 8/1976 | Breed et al. |
| 4,363,248 A | 12/1982 | Brisabois |
| 4,467,672 A | 8/1984 | Lamy |
| 4,722,244 A | 2/1988 | Tsuchiya et al. |
| 4,856,372 A | 8/1989 | Williamson |
| 4,901,599 A | 2/1990 | Irwin |
| 5,545,102 A | 8/1996 | Burgman et al. |
| 6,254,505 B1 | 7/2001 | Forrest |
| 7,025,702 B2 | 4/2006 | Saito et al. |
| 7,081,065 B2 | 7/2006 | Sudou |
| 7,155,997 B2 | 1/2007 | Santelli |
| 7,901,318 B2 * | 3/2011 | Downs et al. ................. 475/230 |
| 2008/0261748 A1 * | 10/2008 | Sudorowski et al. .......... 475/230 |
| 2009/0305835 A1 * | 12/2009 | Sudorowski et al. .......... 475/230 |

* cited by examiner

*Primary Examiner* — Dirk Wright  
(74) *Attorney, Agent, or Firm* — Harness, Dickey & Pierce, P.L.C.

(57) ABSTRACT

A differential having four pinions supported for rotation on cross pins within a differential case. The differential employs a retainer system for securing the cross pins relative to the differential case. The retainer system can include a collar and a plurality of pin members.

21 Claims, 6 Drawing Sheets

FOUR PINION DIFFERENTIAL WITH CROSS PIN RETENTION UNIT AND RELATED METHOD

CROSS-REFERENCE TO RELATED APPLICATIONS

This application is a continuation of U.S. patent application Ser. No. 12/237,726 filed on Sep. 25, 2008, now U.S. Pat. No. 7,901,318. This application claims the benefit of U.S. Provisional Application No. 60/975,613, filed on Sep. 27, 2007. The entire disclosures of each of the above applications are incorporated herein by reference.

FIELD

The present disclosure generally relates to vehicle drivelines and more particularly to a differential for a vehicle driveline.

One type of automotive differential employs a differential housing, a pair of bevel side gears and a plurality of bevel pinions. Some application employ a single pair of bevel pinions that are meshingly engaged with the bevel side gears and supported for rotation in the differential housing about an axis via a single pinion shaft. Vehicle differentials configured for heavier duty applications typically employ two pair of bevel pinions that are meshingly engaged with the bevel side gears. A first pair of the bevel pinions are supported for rotation about a first pinion axis by a first pinion shaft, while a second pair of the bevel pinions are supported about a second pinion axis by a second pinion shaft. In some heavy duty differentials, the first and second pinion shafts are part of a unitarily formed cross-shaped structure. Some other heavy duty differentials employ a configuration in which an aperture or notch is formed in one or both of the first and second pinion shafts. The aperture or notch in one of the first and second pinion shafts provides clearance for the other one of the first and second pinion shaft. Still other heavy duty differentials employ a configuration in which the second pinion shaft is formed by two shaft members that terminate proximate the first pinion shaft. Examples of this configuration include certain models of the TracRite® differential that are commercially available from American Axle & Manufacturing, Inc., Detroit, Mich. and U.S. Pat. No. 7,155,997, the disclosure of which is hereby incorporated by reference as if fully set forth in detail herein.

While such configurations are relatively robust, the coupling of the first and second pinion shafts to the differential housing can be complex and/or costly. Accordingly, there remains a need in the art for an improved heavy duty differential having multiple pinion shafts that can be robustly secured relative to the differential housing in a relatively simple, efficient and cost-effective manner.

SUMMARY

In one form, the present teachings provide a differential for an automotive driveline. The differential includes a differential housing, first and second bevel side gears, a first pinion shaft, a first set of bevel pinions, a second set of bevel pinions and a retainer assembly. The differential housing defines an internal cavity, an axle bore and first and second pinion bores. The axle bore is disposed through the differential housing and intersects the internal cavity. The axle bore is disposed about a rotational axis of the differential housing. The first and second pinion bores are perpendicular to one another and perpendicular to the rotational axis. The first and second bevel side gears are received in the internal cavity and disposed about the rotational axis. The first pinion shaft is received in the first pinion bore and coupled to the differential housing. The first set of bevel pinions are rotatably disposed on the first pinion shaft and meshingly engaged with the first and second bevel side gears. The second set of bevel pinions is meshingly engaged with the first and second bevel side gears. The retainer assembly is received in the second pinion bore and supports the second set of bevel pinions for rotation thereon. The retainer assembly includes a collar, first and second pin portions and a plurality of pin members. The collar is an annular structure that is disposed about the rotational axis radially inwardly of the first and second sets of bevel pinions. The collar has a first set of collar apertures, a second set of collar apertures, a first pin member aperture, and a pair of second pin member apertures. The first pin member aperture is formed transverse to and intersects the first set of collar apertures. The second pair of pin member apertures are spaced apart from one another and are formed transverse to and intersect the second set of pin member apertures. The first pinion shaft is received through the first set of collar apertures. The first pin portion is received in a first side of the second pinion bore, a first one of the second set of bevel pinions and the second set of collar apertures. The second pin portion is received in a second side of the second pin bore, a second one of the second set of bevel pinions and the second set of collar apertures. The first pin member is received into the first pin member aperture and a hole formed in the first pinion shaft. The second pin members are received into respective ones of the second pin member apertures and respective holes formed in the first and second pin portions.

In another form, the present teachings provide a method for assembling an automotive differential. The method includes: providing a differential case having an internal cavity; installing a first bevel side gear into the internal cavity for rotation about a rotational axis; meshingly engaging a first set of bevel pinions to the first bevel side gear for rotation about a first pinion axis; meshingly engaging a second set of bevel pinions to the first bevel side gear for rotation about a second pinion axis; positioning a collar in the internal cavity radially inwardly of the first and second sets of bevel pinions; installing first and second pin portions to the first set of bevel pinions, each of the first and second pin portions extending through the collar, through an associated one of the first set of bevel pinions and engaging the differential case; installing a first pinion shaft to the second set of bevel pinions, the first pinion shaft extending through the collar and the second set of bevel pinions, the first pinion shaft having opposite ends that engage the differential case; installing a first pin member through the collar and the first pinion shaft; installing a second pin member through the collar and the first pin portion; and installing a third pin member through the collar and the second pin portion.

In a further form, the present teachings provide a differential for an automotive driveline. The differential can include a differential housing, first and second side gears, which are received in the differential housing and disposed about a rotational axis, a first pinion shaft, which is received through the differential housing, first and second sets of bevel pinions and a retainer assembly. The first set of bevel pinions is rotatably disposed on the first pinion shaft and are meshingly engaged with the first and second bevel side gears. The second set of bevel pinions are meshingly engaged with the first and second bevel side gears. The retainer assembly includes a retainer structure, first and second pin portions and a plurality of pin members. The retainer structure is disposed radially inwardly of the first and second sets of bevel pinions. The first and second pin portions and the first pinion shaft cooperate to non-rotatably couple the retainer structure to the differential housing. The pin members are received longitudinally into a wall of the retainer structure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

Additional advantages and features of the present invention will become apparent from the subsequent description and the appended claims, taken in conjunction with the accompanying drawings, wherein:

DETAILED DESCRIPTION

Figure 1:
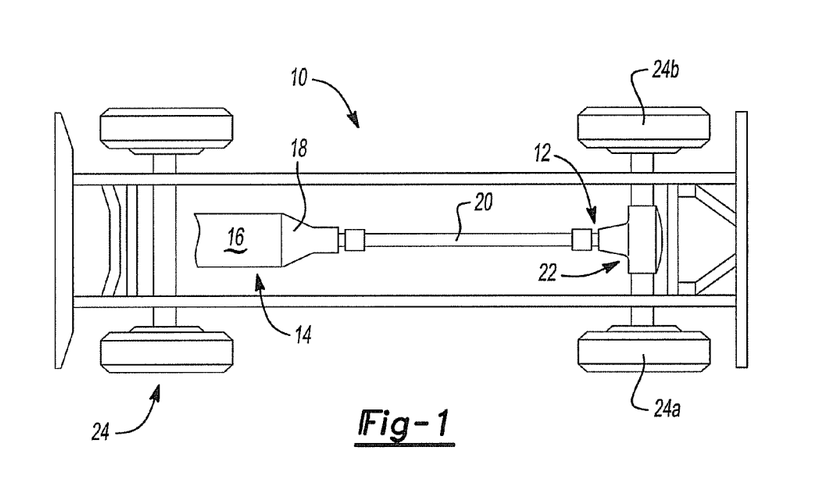
FIG. 1 is a schematic illustration of an exemplary vehicle having a differential unit constructed in accordance with the teachings of the present disclosure.

With reference to FIG. 1 of the drawings, a vehicle having a differential assembly that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a drive shaft 20, a rear axle 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The drive shaft 20 can be coupled for rotation with the output of the transmission 18. Drive torque can be transmitted through the drive shaft 20 to the rear axle 22 where it can be selectively apportion in a predetermined manner to the left and right rear wheels 24a and 24b, respectively.

Figure 2:
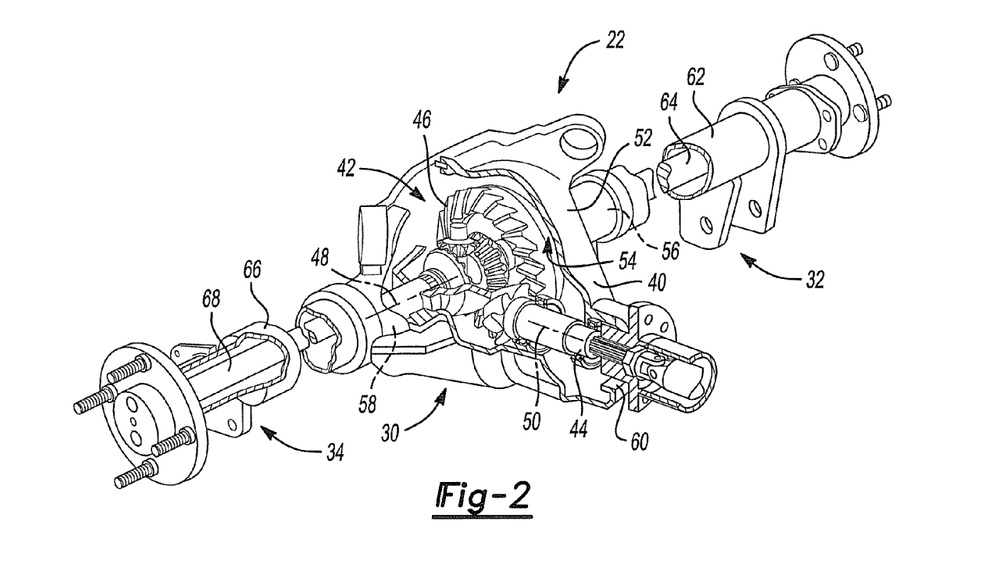
FIG. 2 is a partially broken away perspective view of a portion of the vehicle of FIG. 1 illustrating the rear axle assembly in more detail.

With additional reference to FIG. 2, the rear axle 22 can include a differential assembly 30, a left axle shaft assembly 32 and a right axle shaft assembly 34. The differential assembly 30 can include a housing 40, a differential unit 42, an input pinion 44 and a ring gear 46. The housing 40 can support the differential unit 42 for rotation about a first axis 48 and can further support the input pinion 44 for rotation about a second axis 50 that can be perpendicular to the first axis 48.

The housing 40 can be initially formed in a suitable casting process and thereafter machined as required. The housing 40 can include a wall member 52 that can define a central cavity 54 having a left axle aperture 56, a right axle aperture 58, and an input shaft aperture 60.

The left axle shaft assembly 32 can include a first axle tube 62 fixed to the left axle aperture 56 and a first axle half-shaft 64 that can be supported for rotation in the first axle tube 62 about the first axis 48. Similarly, the right axle shaft assembly 34 can include a second axle tube 66 that can be fixed to the right axle aperture 58 and which can support a second axle half-shaft 68 for rotation about the first axis 48.

The input pinion 44 can be disposed in the input shaft aperture 60 and can meshingly engage the ring gear 46, which can be fixedly but removably coupled to the differential unit 42. It will be appreciated that rotary power transmitted to the input pinion 44 from the drive shaft 20 is employed to drive the differential unit 42 about the first axis 48 via the ring gear 46 in a conventional manner. The differential unit 42 can transmit drive torque to the first and second axle half-shafts 64 and 68 in a predetermined manner.

Figure 3:
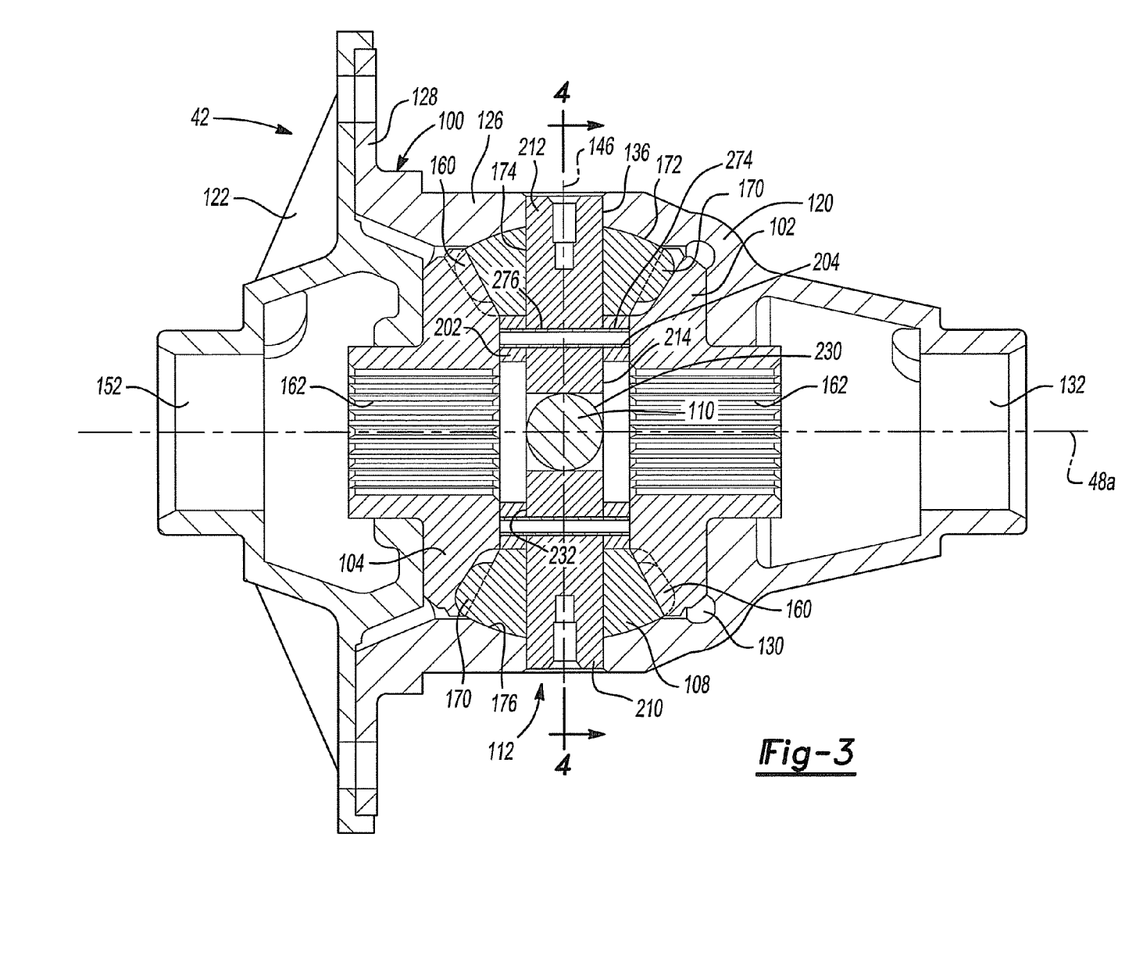
FIG. 3 is a sectional view of a portion of the vehicle of FIG. 1, illustrating the differential unit in longitudinal cross section.
Figure 4:
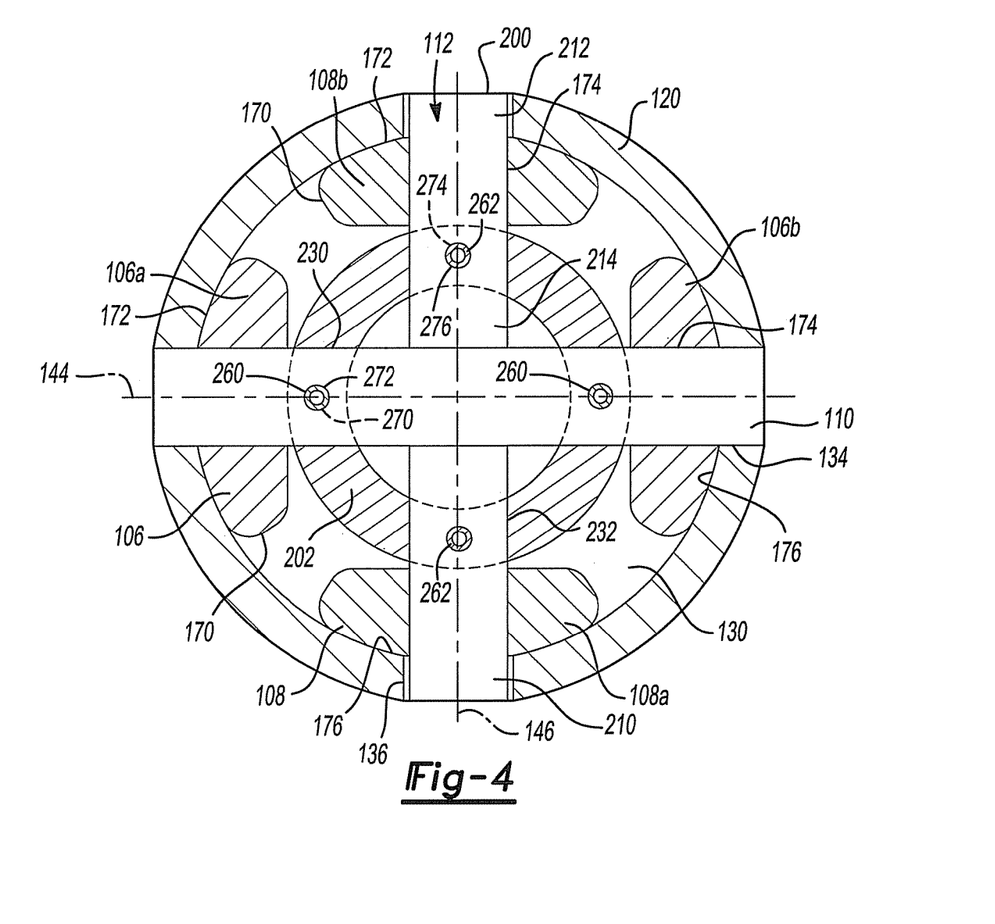
FIG. 4 is a sectional view taken along the line 4-4.

With additional reference to FIGS. 3 and 4, the differential unit 42 can be disposed within the central cavity 54 of the housing 40 and can include a differential housing 100, first and second bevel side gears 102 and 104, respectively, a first set of bevel pinions 106, a second set of bevel pinions 108, a first pinion shaft 110 and a retainer system 112.

The differential housing 100 can include a differential case 120 and a differential cover 122. The differential case 120 can have a body 126 and a flange 128 that can be disposed generally perpendicular to the rotational axis 48a of the differential unit 42. The body 126 can define an internal cavity 130, a first axle bore 132, a first pinion shaft bore 134 and a second pinion shaft bore 136. The first axle bore 132 can be disposed about the rotational axis 48a of the differential unit 42 and can intersect the internal cavity 130 on an end of the body 126 opposite the flange 128. The first pinion shaft bore 134 can extend through the body 126 along a first pinion axis 144 that is generally perpendicular to the rotational axis 48a of the differential unit 42. The second pinion shaft bore 136 can extend through the body 126 along a second pinion axis 146 that is generally perpendicular to both the rotational axis 48a of the differential unit 42 and the first pinion axis 144. The differential cover 122 can be coupled to the differential case 120 to substantially close an end of the differential case 120 opposite the first axle bore 132. The differential cover 122 can define a second axle bore 152 that can be arranged about the rotational axis 48a of the differential unit 42. The first and second axle bores 132 and 152 can be sized and shaped to engage an end of an associated one of the first and second axle half-shafts 64 and 68 (FIG. 2) in a conventional manner that permits drive torque to be transmitted between the differential housing 100 and the first and second axle half shafts 64 and 68 (FIG. 2).

The first and second bevel side gears 102 and 104 can be conventional in their construction and as such, need not be discussed in significant detail herein. Briefly, the first and second bevel side gears 102 and 104 can include a plurality of gear teeth 160 and a central splined aperture 162 that is configured to non-rotatably but axially slide-ably engage a corresponding one of the first and second axle half shafts 64 and 68 (FIG. 2) to permit drive torque to be transmitted between the first and second bevel side gears 102 and 104 and the first and second axle half shafts 64 and 68 (FIG. 2). The first and second bevel side gears 102 and 104 can be received in the internal cavity 130 on opposite sides of the differential case 120 such that they are aligned about the rotational axis 48a of the differential unit 42 and abutted against the differential case 120 and the differential cover 122, respectively.

The first and second sets of bevel pinions 106 and 108 can be can be conventional in their construction and as such, need not be discussed in significant detail herein. Briefly, the first and second sets of bevel pinions 106 and 108 can include gear teeth 170 that can meshingly engage the first and second bevel side gears 102 and 104, a surface 172 opposite the gear teeth 170 that can be configured to engage the differential case 120, and a through bore 174. In the particular example provided, the opposite surface 172 is arcuate in shape and conforms to the arcuate recesses 176 that are formed in the internal cavity 130 of the differential case 120 at the locations where the first and second pinion shaft bores 134 and 136 intersect the interior side of the wall of the differential case 120. The first set of bevel pinions 106 can include a first pinion 106a and a second pinion 106b that can be received in the arcuate recesses 176 that are associated with the first pinion shaft bore 134. The second set of bevel pinions 108 can include a first pinion 108a and a second pinion 108b that can be received in the arcuate recesses 176 that are associated with the second pinion shaft bore 136.

The first pinion shaft 110 can be received in the first pinion shaft bore 134 and through the through bores 174 in the first and second pinions 106a and 106b of the first set of bevel pinions 106.

Figure 5:
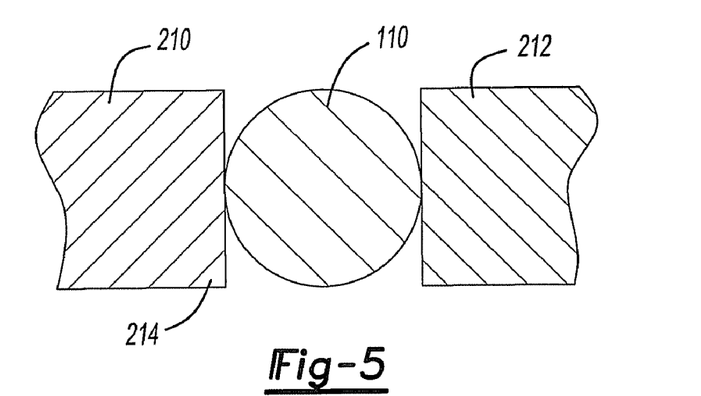
FIG. 5 is an enlarged portion of FIG. 4, illustrating a portion of the differential unit where the first and second pin portions abut the first pinion shaft.
Figure 6:
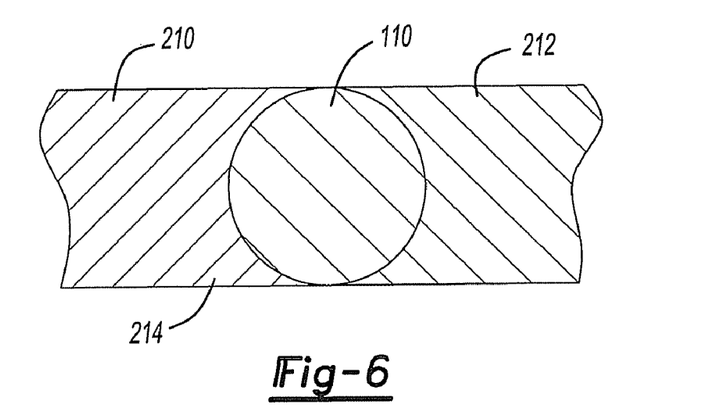
FIGS. 6 and 7 are similar to FIG. 5 but illustrate different end conditions of the first and second pin portions.
Figure 7:
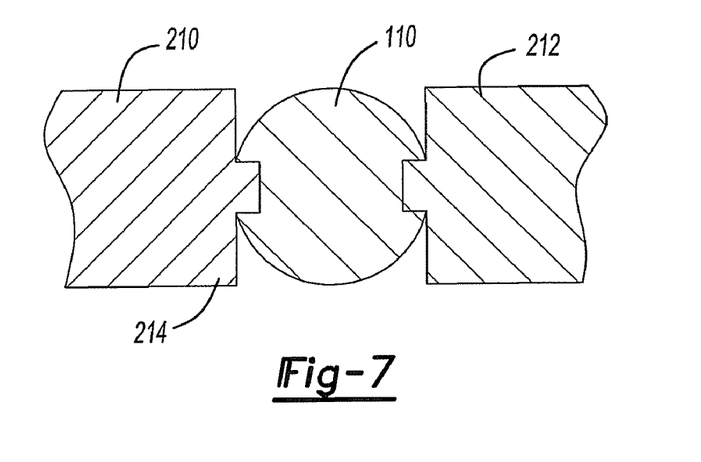

The retainer system 112 can include a second pinion shaft 200, a collar 202 and a plurality of pin members 204. The second pinion shaft 200 can support the second set of bevel pinions 108 for rotation in the internal cavity 130 about the second pinion axis 146. The second pinion shaft 200 can include a first pin portion 210 on which the first pinion 108a is rotatably disposed, and a second pin portion 212 on which the second pinion 108b is rotatably disposed. The first and second pin portions 210 and 212 can be received in the second pinion shaft bore 136 along the second pinion axis 146. In the particular example provided, the first and second pin portions 210 and 212 are discrete cylindrically-shaped members having inner ends 214 that are generally flat and orthogonal to the second pinion axis 146 as shown in FIG. 5. It will be appreciated, however, that the first and second pin portions 210 and 212 could have inner ends 214 that conform to a shape of at least a portion of the first pinion shaft 110, an example of which is shown in FIG. 6 or engage one or more holes 216 that can be formed in the first pinion shaft 110 as shown in FIG. 7.

Returning to FIGS. 3 and 4, the collar 202 can be disposed in the internal cavity 130 radially inward of the first and second sets of bevel pinions 106 and 108. The collar 202 can be an annular structure having a first set of apertures 230, which can be sized to receive the first pinion shaft 110 therethrough, and a second set of apertures 232 that are sized to receive the first and second pin portions 210 and 212 therethough. Accordingly, it will be appreciated that the collar 202 supports the first and second pin portions 210 and 212 on a side opposite the wall of the differential case 120. The collar 202 can have a width that can be sufficient to fully support the first pinion shaft 110 and/or the first and second pin portions 210 and 212 (i.e., the outer ends of the first pinion shaft 110 and/or the outer ends of the first and second pin portions 210 and 212 need not engage the differential case 120).

The pin members 204 can include a first set of pin members 260 and a second set of pin members 262. While the first and second sets of pin members 260 and 262 can be any type of pins, roll pins are employed in the example illustrated. The first set of pin members 260 can be received through holes 270 formed through the collar 202 and holes 272 formed through the first pinion shaft 110. In the example provided, the first set of pin members 260 includes a pair of pin members, but it will be appreciated that the first set of pin members 260 could include a single pin member. The second set of pin members 262 can be received through holes 274 formed through the collar 202 and holes 276 formed through the first and second pin portions 210 and 212.

The first and second sets of pin members 260 and 262 can be installed to the holes 270 and 274, respectively, and the holes 272 and 276, respectively, in a direction that can be generally parallel to the rotational axis 48a of the differential unit 42. Accordingly, it will be appreciated that the first and second pinion shafts 110 and 200 can be secured to one another in a cost-efficient manner.

Figure 8:
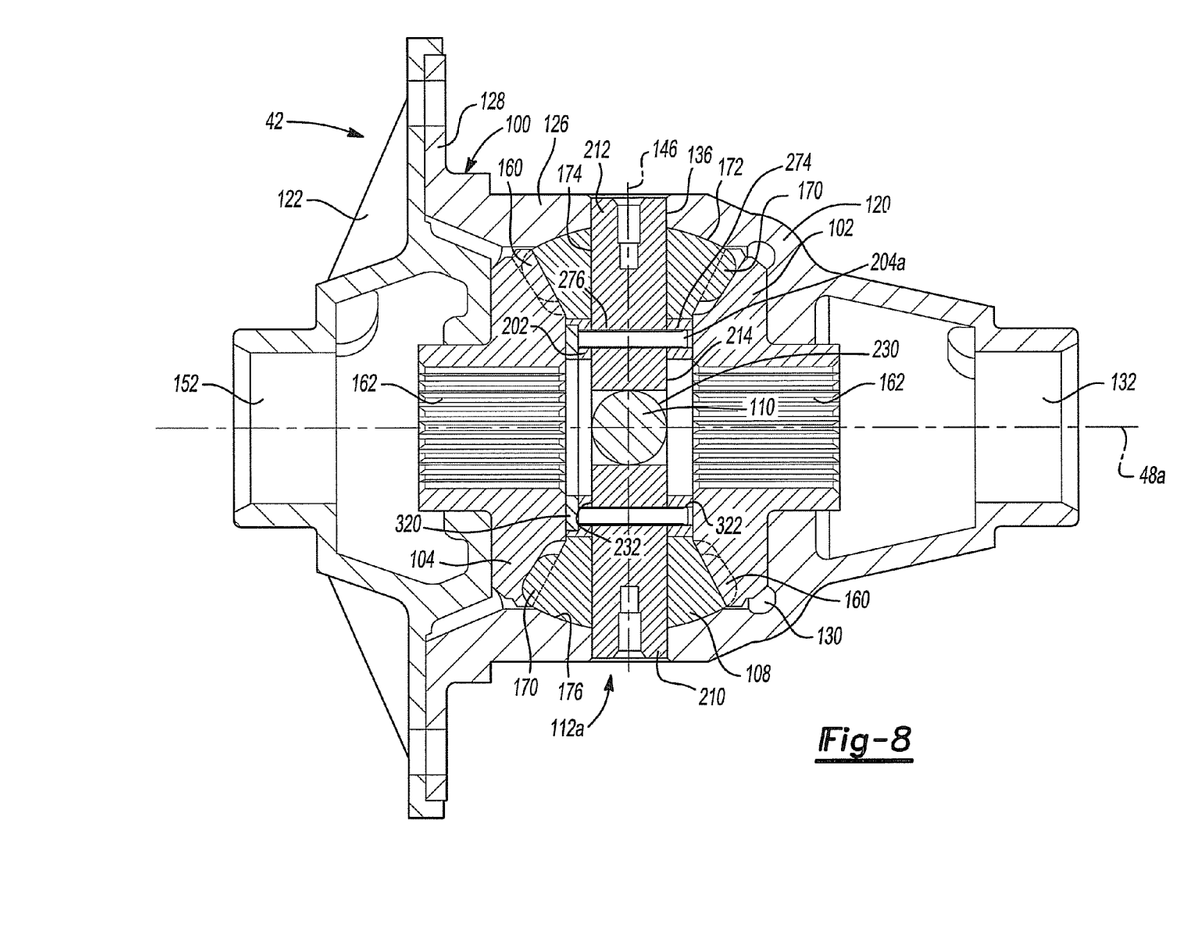
FIG. 8 is a sectional view similar to FIG. 3, but illustrating another differential unit constructed in accordance with the teachings of the present disclosure.
Figure 9:
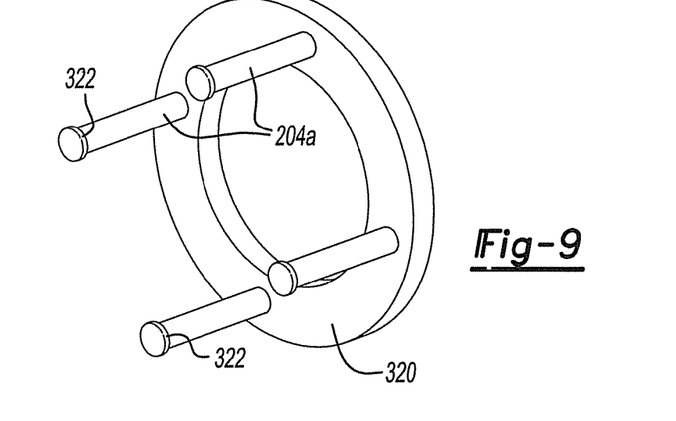
FIG. 9 is a perspective view of a portion of the differential unit of FIG. 8.

While the retainer system 112 has been illustrated and described herein as including a plurality of discrete pin members, it will be appreciated that a differential constructed in accordance with the teachings of the present disclosure could be constructed somewhat differently. For example, the retainer system 112a could include a plate member 320 to which one or more of the pin members 204a can be coupled as shown in FIGS. 8 and 9. The pin members 204a can be coupled to the plate member 320 in any appropriate manner, such as press-fit, welded (e.g., friction welded, resistance welded) or integrally formed with the plate member 320. One or more of the pin members 204a can include a protrusion, such as a tab or circumferentially-extending rib or bead 322 that can be sized to frictionally engage the collar 202a on a side opposite the first pinion shaft 110 and/or the first and second pin portions 210 and 212 to thereby resist withdrawal of the pin member(s) 204a from the collar 202a.

Figure 10:
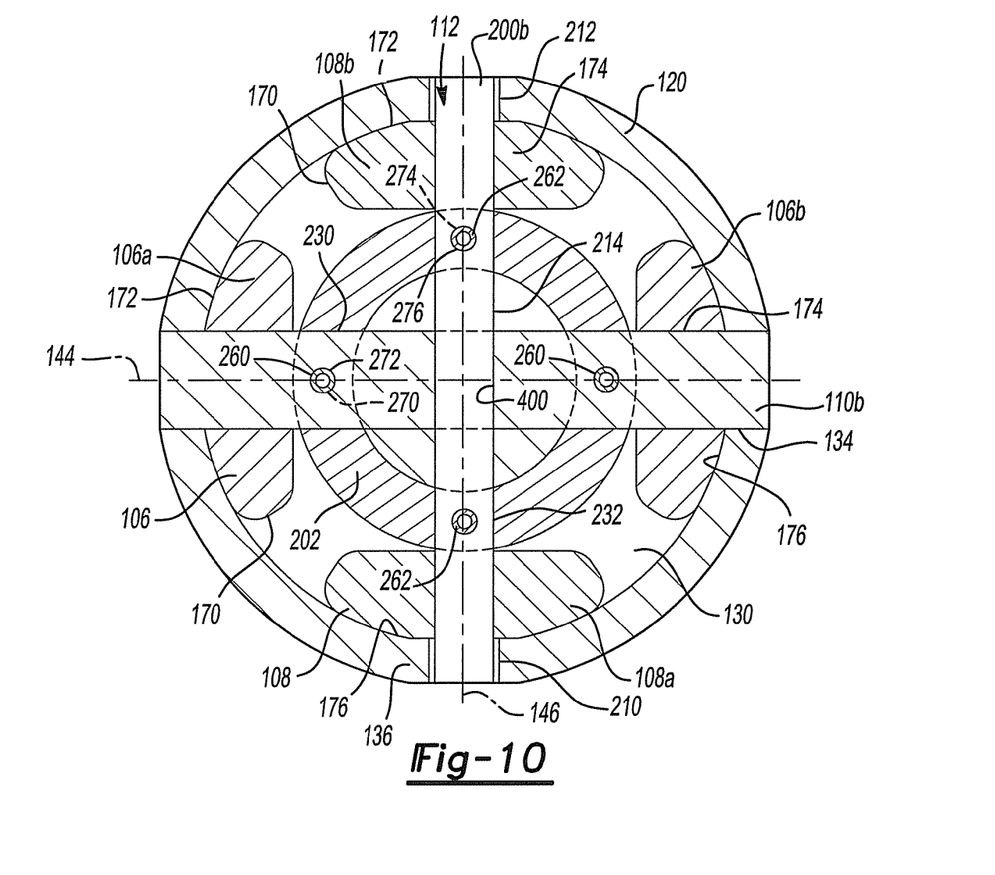
FIG. 10 is a sectional view of a portion of another differential constructed in accordance with the teachings of the present disclosure, the sectional view being taken longitudinally through the first and second pin portions and the first pinion shaft.

In the example of FIG. 10, the first pinion shaft 110b is relatively larger in diameter than the second pinion shaft 200b. An aperture 400 can be formed through the first pinion shaft 110b through which the second pinion shaft 200b can extend. Configuration in this manner permits the first and second pin portions (not specifically shown) to be a part of a unitary structure.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A differential for an automotive driveline, the differential comprising:

a differential housing;

first and second bevel side gears received in the differential housing and disposed about a rotational axis;

a first pinion shaft received through the differential housing;

a first set of bevel pinions rotatably disposed on the first pinion shaft and meshingly engaged with the first and second bevel side gears;

a second set of bevel pinions meshingly engaged with the first and second bevel side gears; and a retainer assembly comprising a retainer structure, first and second pin portions and a plurality of pin members, the retainer structure being disposed radially inwardly of the first and second sets of bevel pinions, the first and second pin portions and the first pinion shaft cooperating to non-rotatably couple the retainer structure to the differential housing, wherein the pin members are received longitudinally into a wall of the retainer structure.

2. The differential of claim 1, wherein at least one of the pin members comprises a roll pin.

3. The differential of claim 1, wherein at least one of the pin members frictionally engages at least one of the first pin portion, the second pin portion and the first pinion shaft.

4. The differential of claim 1, wherein the first and second pin portions are discrete structures.

5. The differential of claim 4, wherein each of the first and second pin portions has an inner end that is disposed adjacent the first pinion shaft and wherein the inner end has a flat end surface that abuts the first pinion shaft.

6. The differential of claim 4, wherein each of the first and second pin portions has an inner end that abuts the first pinion shaft and wherein the inner end has a first surface that at least partially conforms to a corresponding portion of a second surface of the first pinion shaft.

7. The differential of claim 6, wherein the corresponding portion of the surface of the first pinion shaft is cylindrically shaped.

8. The differential of claim 1, wherein at least a portion of the first pin portion extends into the first pinion shaft.

9. The differential of claim 8, wherein at least a portion of the second pin portion extends into the first pinion shaft.

10. The differential of claim 1, wherein at least a portion of the pin members are coupled to a plate member that abuts the retainer structure.

11. The differential of claim 10, wherein all of the pin members are coupled to the plate member.

12. The differential of claim 10, wherein at least one of the pin members that is coupled to the plate member carries a feature that engages the retainer structure to resist withdrawal of the at least one of the pin members from the retainer structure.

13. The differential of claim 1, wherein at least one of the pin members carries a feature that engages the retainer structure to resist withdrawal of the at least one of the pin members from the retainer structure.

14. The differential of claim 1, wherein the first and second pin portions are formed on a second pinion shaft.

15. The differential of claim 14, wherein the first pinion shaft has an aperture through which the second pinion shaft extends through.

16. A method for assembling an automotive differential, the method comprising:

providing a differential case having an internal cavity;

positioning a collar in the internal cavity, the collar having an annular wall;

mounting a first set of bevel pinions on a first pinion shaft for rotation within the internal cavity, the first pinion shaft extending through the collar;

installing first and second pin portions to a second set of bevel pinions, each of the first and second pin portions extending through the collar, through an associated one of the second set of bevel pinions and engaging the differential case; and installing a plurality of pin members into the annular wall of the collar and through at least two of the first pinion shaft, the first pin portion and the second pin portion.

17. The method of claim 16, wherein at least one of the pin members is a roll pin.

18. The method of claim 16, wherein the first pin portion is matingly engaged against an exterior surface of the first pinion shaft to inhibit rotation of the pin portion about its longitudinal axis.

19. The method of claim 16, wherein at least two of the pin members are coupled to a plate member.

20. The method of claim 19, wherein the at least two of the pin members and the plate member are unitarily formed.

21. The method for assembling an automotive differential assembly, comprising:

providing a differential case having an internal cavity;

positioning a collar within the internal cavity, the collar having a set of first apertures and a set of second apertures;

mounting a set of first bevel pinions for rotation on a first pinion shaft within the internal cavity, the first pinion shaft extending through the set of first apertures in the collar;

mounting a set of second bevel pinions for rotation on first and second pin portions of a second pinion shaft within the internal cavity, the first and second pin portions each extending through one of the set of second apertures in the collar;

installing a plurality of pin members into the collar and into engagement with at least two of the first pinion shaft, the first pin portion and the second pin portion; and engaging at least one of the first pinion shaft and the second pinion shaft with the differential case so as to non-rotatably couple the collar for rotation with the differential case.

* * * * *